(12) United States Patent
Kim et al.

(10) Patent No.: US 9,523,160 B2
(45) Date of Patent: Dec. 20, 2016

(54) METHOD OF PREPARING ANTIMICROBIAL 3D-PRINTING FILAMENT

(71) Applicant: BnK Co., Ltd., Ulsan (KR)

(72) Inventors: Sungjin Kim, Ulsan (KR);
Younghyeok Kim, Ulsan (KR);
Hyeongju Kim, Ulsan (KR); Youngsoo Kim, Ulsan (KR)

(73) Assignee: BNK CO., LTD., Ulsan (KR)

( * ) Notice: Subject to any disclaimer, the term of this patent is extended or adjusted under 35 U.S.C. 154(b) by 0 days.

(21) Appl. No.: 14/582,594

(22) Filed: Dec. 24, 2014

(65) Prior Publication Data

US 2016/0069001 A1 Mar. 10, 2016

(30) Foreign Application Priority Data

Sep. 5, 2014 (KR) ........................ 10-2014-0119109

(51) Int. Cl.
| | |
|---|---|
| *B32B 27/00* | (2006.01) |
| *C08J 5/00* | (2006.01) |
| *C08L 23/00* | (2006.01) |
| *C08L 23/08* | (2006.01) |
| *D01F 1/10* | (2006.01) |
| *B33Y 70/00* | (2015.01) |

(52) U.S. Cl.
CPC ............... *D01F 1/103* (2013.01); *B33Y 70/00* (2014.12); *D10B 2331/041* (2013.01); *D10B 2401/13* (2013.01)

(58) Field of Classification Search
None
See application file for complete search history.

(56) References Cited

U.S. PATENT DOCUMENTS

| | | | | |
|---|---|---|---|---|
| 2006/0171990 A1* | 8/2006 | Asgari | ................. | A61K 9/0024 424/426 |
| 2012/0271396 A1* | 10/2012 | Zheng | ..................... | A61L 27/58 623/1.2 |
| 2013/0331927 A1* | 12/2013 | Zheng | ....................... | A61F 2/82 623/1.19 |
| 2015/0291921 A1* | 10/2015 | Rives | .................. | B29C 67/0081 425/130 |

FOREIGN PATENT DOCUMENTS

KR 101394119 B1 5/2014

\* cited by examiner

*Primary Examiner* — Peter A Salamon
(74) *Attorney, Agent, or Firm* — Lucas & Mercanti, LLP

(57) ABSTRACT

Disclosed is a method of preparing an antimicrobial 3D-printing filament, comprising: providing a first mixture comprising a plastic resin and at least one antimicrobial agent selected from the group consisting of an inorganic antimicrobial agent, an organic antimicrobial agent, a metal antimicrobial agent, an ammonium salt antimicrobial agent, a guanidine antimicrobial agent, a copper compound antimicrobial agent, a sustained-release polymer antimicrobial agent, and a natural antimicrobial agent; providing a master batch by extruding the first mixture; and preparing an antimicrobial filament by excluding a second mixture containing the master batch and the plastic resin.

5 Claims, 3 Drawing Sheets

METHOD OF PREPARING ANTIMICROBIAL 3D-PRINTING FILAMENT

CROSS-REFERENCE TO RELATED APPLICATION

This application claims the benefit of Korean Patent Application No. 10-2014-0119109, filed Sep. 5, 2014, and all the benefits accruing therefrom under 35 U.S.C. §119 and the contents of which is hereby incorporated by reference as is fully set forth herein.

FIELD OF THE INVENTION

The disclosure relates to a method of preparing an antimicrobial 3D-printing filament, and more particularly, to an antimicrobial 3D-printing filament including an inorganic antimicrobial agent, an organic antimicrobial agent, or a natural antimicrobial agent to kill or inhibit viruses, bacteria, or fungi.

BACKGROUND OF THE INVENTION

A 3D printer is a device for three-dimensionally printing a material to have the same or a similar shape using X-, Y- and Z-axis data of the material, and a use of the 3D printer is constantly increasing. While the 3D printer has been used to form a sample product before commercialization, recently a technical base that can be directly applied to mass-producible products such as order-made small quantity batch products is being established, and therefore a future market for the 3D printer is expected to rapidly expand.

A method of plasticizing a product using a 3D printer may be a subtractive manufacturing process, which is a conventional producing method such as cutting or carving a material, or an additive manufacturing process, which is a method of stacking layers. Also the method can be classified as a liquid-, powder-, or solid-based method according to a characteristic of a material used.

A solid-based process is generally carving a solid-type material, and a type of processing the material is changed according to a source material.

Fused deposition modeling (FDM) is a method of melting and stacking a string-type material by layers. The FDM method is most actively developed in a 3D printer market, and most economical.

As the 3D printer is gradually decreased in price and commercialized, the 3D printer is used for home use as well as industrial use.

However, an output of a conventional filament material for a 3D printer may be easily contaminated by viruses or bacteria by a continuous use.

Particularly, since children are considerably decreased in the level of immunity compared to adults, it is necessary to find a solution for preventing a serious problem caused by virus and toxicity in advance.

However, in Korean Patent No. 10-1394119 (May 7, 2014), technology of a composition for a 3D-printing filament is disclosed, and the composition has a high solidification rate and an excellent sliding characteristic, but has a low antimicrobial activity.

SUMMARY OF THE INVENTION

Exemplary embodiments according to the present invention provide a 3D-printing filament, including an inorganic, organic, or natural antimicrobial agent having an antimicrobial activity to kill or inhibit bacteria such as *Escherichia coli* (*E. coli*), *Salmonella*, or *Staphylococcus aureus*, and viruses.

Exemplary embodiment also A method of preparing an antimicrobial 3D-printing filament, comprising: providing a first mixture containing a plastic resin and at least one antimicrobial agent selected from the group consisting of an inorganic antimicrobial agent, an organic antimicrobial agent, a metal antimicrobial agent, an ammonium salt antimicrobial agent, a guanidine antimicrobial agent, a copper compound antimicrobial agent, a sustained-release polymer antimicrobial agent, and a natural antimicrobial agent (S100); providing a master batch by extruding the first mixture (S200); and preparing an antimicrobial filament by excluding a second mixture containing the master batch and the plastic resin (S300).

The 3D-printing filament of the present invention may provide a stable 3D output which contains an antimicrobial agent and thus may minimize contamination caused by bacteria or viruses, and can be freely used by children having low immunity.

However, the effect of the present invention is not limited to the above-described effect, but it should be understood that it includes all of effects that can be derived from the configuration of the present invention disclosed in the detailed description or claims of the present invention.

BRIEF DESCRIPTION OF THE DRAWINGS

Exemplary embodiments are described in further detail below with reference to the accompanying drawings. It should be understood that various aspects of the drawings may have been exaggerated for clarity.

DETAILED DESCRIPTION OF THE INVENTION

Figure 1:
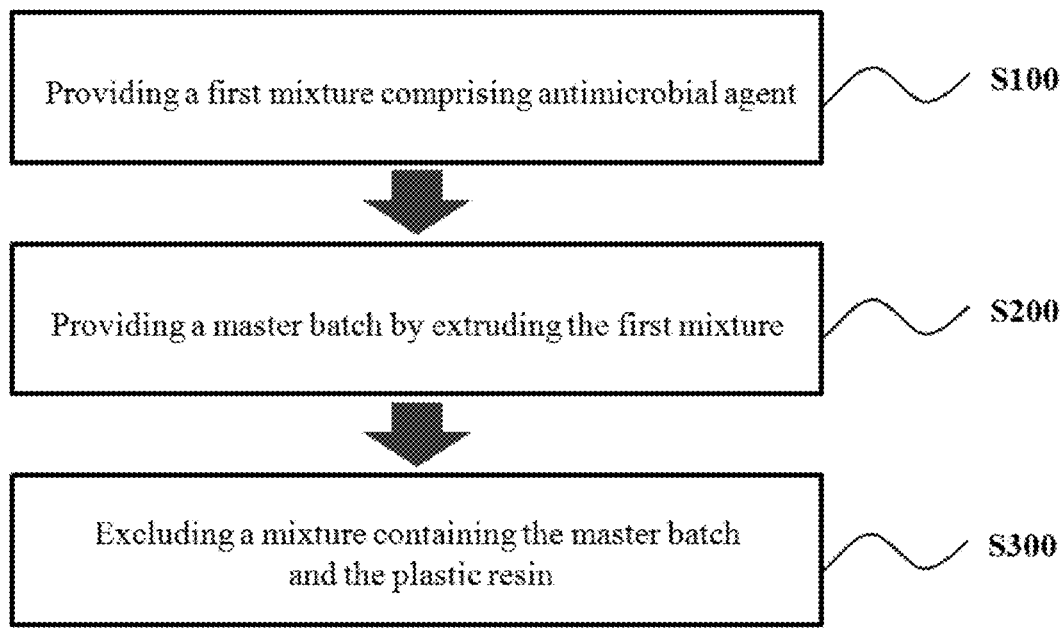
FIG. 1 is a method of manufacturing a 3D-printing filament according to the present invention.

Various exemplary embodiments will now be described more fully with reference to the accompanying drawings in which some exemplary embodiments are shown. In the drawings, the thicknesses of layers and regions may be exaggerated for clarity.

The present invention provides an antimicrobial filament composition for a 3D printer, which is prepared by extruding a functional master batch including an inorganic, organic, or natural antimicrobial agent and a thermoplastic resin.

The organic antimicrobial agent may be generally a liquid, and may be added to a product which is necessary to maintain an antimicrobial strength for a short time.

The organic antimicrobial agent has a higher temporary antimicrobial strength than an inorganic antimicrobial agent, but persistence of the antimicrobial strength is relatively short.

The inorganic antimicrobial agent is generally a material formed by substituting an inorganic material such as zeolite, calcium phosphate, zirconium phosphate, or silica gel with a metal ion having an antimicrobial action such as silver, zinc, or copper, and is used in various fields such as plastics, papers, and fabrics.

The inorganic antimicrobial agent has a high safety to a human body, no resistant bacteria, and a long antimicrobial persistent period, compared to the organic antimicrobial agent.

The inorganic antimicrobial agent may be zeolite, calcium phosphate, or zirconium phosphate, and preferably zeolite.

The zeolite-based inorganic antimicrobial agent has an excellent antimicrobial strength, a low particle hardness, is not discolored, and is highly safe, compared to other antimicrobial agents.

The natural antimicrobial agent is a material derived from a natural substance such as moutan, grape fruit seeds, bamboo, fig, mugwort, aloe, sage plant, phytoncide, or green tea extracts, and has excellent safety to a human body, is environmentally-friendly, and has low thermal resistance and photostability.

FIG. 1 illustrates a method of preparing a 3D-printing filament according to the present invention.

Hereinafter, the method of preparing a 3D-printing filament is described in detail with reference to the above-described drawings.

Providing a First Mixture Containing a Plastic Resin and Antimicrobial Agent (S100)

The operation of mixing a plastic resin and an antimicrobial agent is to provide a functional master batch by mixing a plastic material with at least one antimicrobial agent selected from the group consisting of an inorganic antimicrobial agent, an organic antimicrobial agent, a metal antimicrobial agent, an ammonium salt antimicrobial agent, a guanidine antimicrobial agent, a copper compound antimicrobial agent, a sustained-release polymer antimicrobial agent, and a natural antimicrobial agent.

Specifically, an antimicrobial filament composition for a 3D printer may be prepared by mixing 1 to 8 parts by weight of the functional master batch including a thermoplastic resin [(polylactic acid (PLA), acrylonitrile butadiene styrene (ABS), polypropylene (PP), polyethylene (PE), high impact polystyrene (HIPS), ethylene vinyl acetate (EVA), thermoplastic polyolefin (TPO), rubber, nylon, etc.] and at least one organic antimicrobial agent, a natural antimicrobial agent, or inorganic antimicrobial agent, and 92 to 99 parts by weight of the plastic resin.

The plastic resin is a main component of the composition of a 3D-printing filament, and at least one may be selected from the group consisting of PLA, ABS, PP, PE, HIPS, EVA, TPO, and nylon.

The PLA is a 100% renewable source such as corn starch or potato starch, which exhibits excellent biodegradability, and thus is environmentally friendly.

The ABS is a thermoplastic polymer generally used, and a temperature for extrusion is 215 to 250° C.

The PP has a light weight, and excellent processability, thermal resistance, and wear resistance.

The PE exhibits a rich and bright color, has excellent flexibility at an ultimately low temperature, and has good thermal resistance, insulability, and drug resistance.

The HIPS is prepared by adding rubber to the PS, and has excellent impact resistance.

The EVA has excellent flexibility, impact resistance, texture, insulability, and thermokeeping property, and various types of EVA can be produced depending on foaming.

The nylon has excellent mechanical and chemical properties, excellent wear resistance, a light weight, and a good plasticity.

To provide the functional master batch, 85 to 95 parts by weight of the plastic resin and 5 to 15 parts by weight of the antimicrobial agent may be mixed.

The antimicrobial agent may be an inorganic antimicrobial agent, an organic antimicrobial agent, or a natural antimicrobial agent.

The inorganic antimicrobial agent may be a material prepared by substituting an inorganic material such as zeolite, calcium phosphate, zirconium phosphate, or silica gel with a metal ion having an antimicrobial function such as silver, zinc, or copper, the organic antimicrobial agent may be an ammonium salt, thiabendazole, isothiazole, zinc pyrithione, imidazole, carbendazole, or triclosan, and the natural antimicrobial agent may be moutan, grape fruit seeds, bamboo, fig, mugwort, aloe, sage plant, phytoncide, or green tea extracts.

Particularly, the zeolite-based inorganic antimicrobial agent has a high antimicrobial strength, a low particle hardness, and excellent safety.

The 3D-printing filament according to the present invention includes an antimicrobial agent, and particularly, an inorganic antimicrobial agent carrying antimicrobial functional metals such as silver and zinc using zeolite having an antimicrobial property as a carrier, and therefore contamination caused by bacteria and viruses causing a disease is minimized, and the filament has excellent thermal resistance and persistence of an antimicrobial strength.

Providing a Master Batch (S200)

The master batch may be prepared by extruding a mixture containing antimicrobial agent and a plastic resin using an extrusion device.

However, a temperature and conditions for extruding the functional master batch may be different according to a type of the plastic resin.

For example, PLA extrusion conditions may include a melt resin temperature of 210° C., a feed temperature of 45° C., temperatures in a screw of 180° C. at a supply part, 190° C. at a compression part, 200° C. at a measurement part, 200° C. at an adaptor, and 190° C. at a die, and a screw speed of 20 to 100 rpm.

The extrusion conditions applied to the embodiment below include a feed temperature of 34° C., a temperature of a supply part of 228° C., a temperature of an extrusion part of 225° C., a temperature of a measurement part of 225° C., and a temperature of a die of 156° C.

Preparing an Antimicrobial Filament (S300)

This is an operation of providing an antimicrobial plastic filament by mixing a functional master batch and a plastic resin, and extruding the mixture through an extrusion device.

Specifically, in the operation of providing a functional master batch, the antimicrobial plastic filament may be prepared by mixing 85 to 95 parts by weight of the plastic resin and 5 to 15 parts by weight of an antimicrobial agent, and mixing 1 to 8 parts by weight of the functional master batch and 92 to 99 parts by weight of the plastic resin.

When the functional master batch is less than 1 part by weight, an effective antimicrobial function may not be expected, and when the functional master batch is more than 8 parts by weight, a degree of increasing an antimicrobial strength is insignificant, and in consideration of economic feasibility, 1 to 8 parts by weight of the functional master batch may be mixed with 92 to 99 parts by weight of a thermoplastic resin.

The mixture may be extruded by an extrusion device, and may be manufactured in a filament type by spinning extrusion.

A temperature of the screw may be changed according to a type of the plastic resin.

Meanwhile, the mixture containing the plastic resin and the antimicrobial agent may further comprises, at least one selected from the group consisting of a plasticizer, an antioxidant, a thermal stabilizer, a UV stabilizer, a flame retardant, a lubricant, an antistatic agent, a foaming agent, an impact reinforcing agent, a filler, a crosslinking agent, a coloring agent, an antifogging agent, a nucleating agent, an antiblocking agent and a slip agent.

That is, according to physical properties and characteristics of the plastic resin, or a type of a final product, a type of an additive may be changed.

Specifically, the plasticizer may be added to increase flexibility, workability in processing, or an expanding property.

The antioxidant may inhibit or block a chemical reaction between plastic and oxygen, thereby preventing losing original physical properties due to degradation of the plastic.

The thermal stabilizer may inhibit or block thermal degradation of the plastic occurring when being mixed or plasticized at a high temperature.

The UV stabilizer may prevent degeneration of a color or a mechanical property due to degradation of the plastic from UV rays.

The flame retardant may reduce flammability of the plastic.

The lubricant may lubricate a metal surface in contact with the plastic during processing, plasticizing, or extrusion to increase flowability.

The antistatic agent inhibits or removes generation of static electricity formed on a surface of the plastic.

The foaming agent may be added to form a porous product such as sponge or styrofoam from the plastic.

The impact reinforcing agent may enhance impact resistance of the plastic.

The filler may be added in a large amount to reduce a cost, or added to improve a mechanical, thermal, or electrical property or processability.

The crosslinking agent may be added to stimulate a crosslinking reaction of a liquid resin.

The coloring agent may be basically divided into a pigment and a dye, and may be added to coloring of the plastic resin.

The antifogging agent may be added to increase a surface tension of a plastic film and enhance an affinity to water.

The nucleating agent may be added to stimulate a crystallization rate of a polymer, reduce a crystal size, thereby enhancing transparency, and increase a crystallization rate.

Hereinafter, the present invention will be further described in detail with reference to an exemplary example of the present invention.

EXAMPLE

Antimicrobial Test for *E. coli* and *Salmonella* Strains

An antimicrobial master batch was prepared by mixing a zeolite-based inorganic antimicrobial agent substituted with a silver ion and a PLA resin in a weight ratio of 1:9, and filaments having diameters of 1.75 mm and 3 mm, respectively, were manufactured through spinning extrusion by mixing the antimicrobial master batch and a thermoplastic resin.

Results of the antimicrobial test for *E. coli* and *Salmonella* strains of the manufactured filament sample for a 3D printer are shown in Table 1.

TABLE 1

Figure 2:
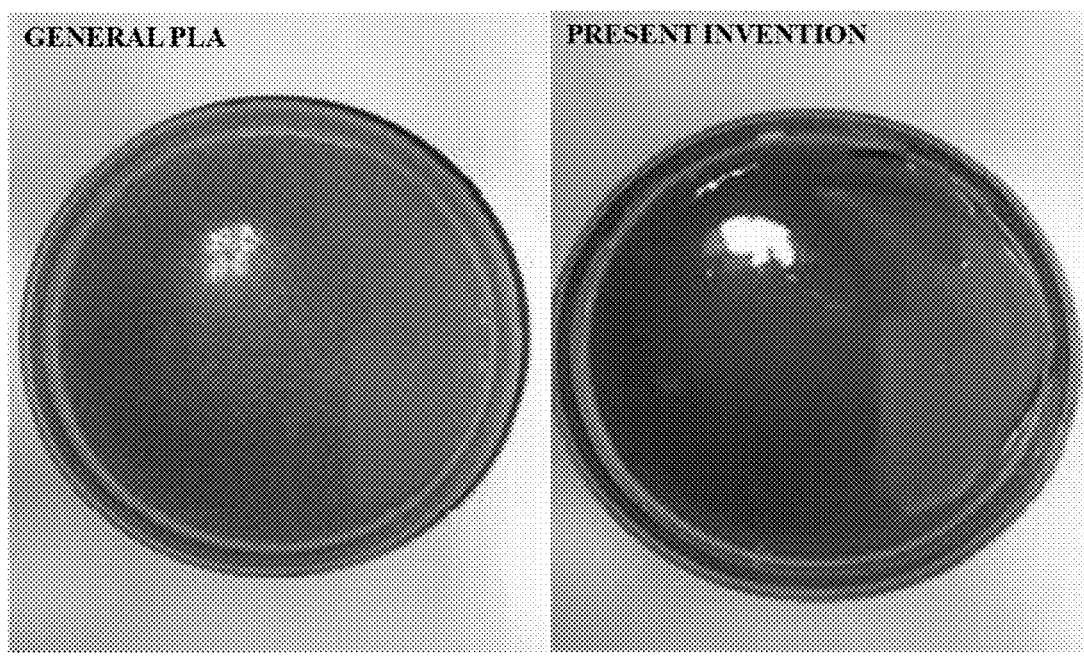
FIG. 2 shows results for an antimicrobial test with respect to *E. coli*.
Figure 3:
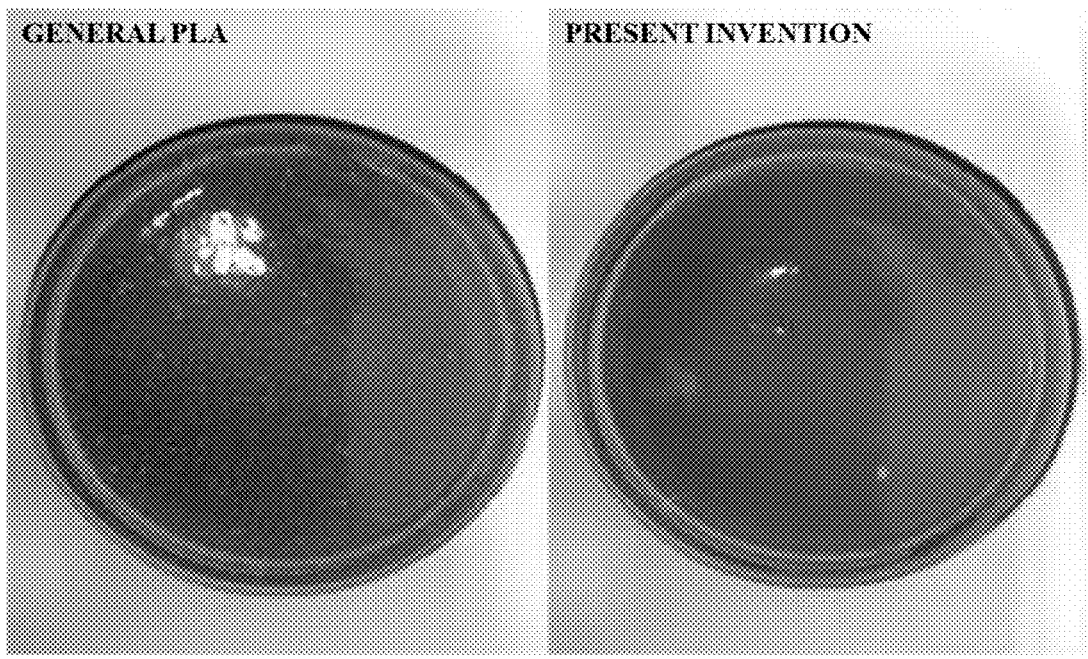
FIG. 3 shows results for an antimicrobial test with respect to *Salmonella*.

| Test category | | Test result | | | | |
|---|---|---|---|---|---|---|
| | | Initial concentration (CFU/mL) | Concentration after 24 hours (CFU/mL) | Antimicrobial activity (log) | Bacteria reduction rate (%) | Remarks |
| Antimicrobial test using *E. coli* | General PLA | $2.70 \times 10^5$ | $8.10 \times 10^4$ | | — | FIG. 2 |
| | Example | $1.00 \times 10^5$ | <2 | 5.82 | 99.99 | |
| Antimicrobial test using *Salmonella* | General PLA | $1.00 \times 10^5$ | $3.32 \times 10^5$ | | — | FIG. 3 |
| | Example | $1.00 \times 10^5$ | <1 | 4.18 | 99.99 | |

The CFU is an abbreviation of a colony forming unit.

According to a result of measuring an antimicrobial strength to the filament sample for a 3D printer, in the antimicrobial agent-added filament (Example) as shown in FIGS. 2 and 3, *E. coli* and *Salmonella* were decreased in cell count after 24 hours to have a bacteria reducing rate of 99.99%, and in a commercial filament in which an antimicrobial agent is not added, *E. coli* and *Salmonella* were not reduced in cell count after 24 hours.

That is, the test results can clearly show that an antimicrobial 3D-printing filament to be developed in the present invention has a better antimicrobial capability than a conventional commercial filament product.

The above description of the present invention is provided to exemplify, and it should be understood that those of ordinary skill in the art can easily modify the present invention in different specific types without changing a technical spirit or essential characteristics of the present invention. Therefore, it should be understood that the above-described embodiments are exemplary in all aspects and not limiting. For example, each component described in a single type may be distributed, and components described to be distributed may also be combined.

While exemplary embodiments have been disclosed herein, it should be understood that other variations may be possible. Such variations are not to be regarded as a departure from the spirit and scope of exemplary embodiments of the present application, and all such modifications as would be obvious to one skilled in the art are intended to be included within the scope of the following claims.

What is claimed is:

1. A method for preparing an antimicrobial filament for 3D printing comprising:
    providing a first mixture comprising a plastic resin and at least one antimicrobial agent selected from the group consisting of an inorganic antimicrobial agent, an organic antimicrobial agent, a metal antimicrobial agent, an ammonium salt antimicrobial agent, a guanidine antimicrobial agent, a copper compound antimicrobial agent, a sustained-release polymer antimicrobial agent, and a natural antimicrobial agent;

providing a master batch by extruding the first mixture; and preparing an antimicrobial filament by extruding a second mixture containing the master batch and the plastic resin, wherein the first mixture comprises 85 to 95 parts by weight of the plastic resin and 5 to 15 parts by weight of the antimicrobial agent.

2. The method according to claim 1, wherein the plastic resin is at least one selected from the group consisting of polylactic acid (PLA), acrylonitrile butadiene styrene (ABS), polypropylene (PP), polyethylene (PE), high impact polystyrene (HIPS), ethylene vinyl acetate (EVA), thermoplastic polyolefin (TPO), and nylon, the inorganic antimicrobial agent is at least one selected from the group consisting of zeolite, calcium phosphate, zirconium phosphate, and a silica gel, the organic antimicrobial agent is at least one selected from the group consisting of an ammonium salt, thiabendazole, isothiazole, zinc pyrithione, imidazoles, carbendazole, and triclosan, and the natural antimicrobial agent is at least one selected from the group consisting of moutan, grape fruit seeds, bamboo, fig, mugwort, aloe, sage plant, phytoncide, and green tea extracts.

3. The method according to claim 1, wherein the second mixture comprises 1 to 8 parts by weight of the functional master batch and 92 to 99 parts by weight of the plastic resin.

4. The method according to claim 1, wherein the first mixture further comprises at least one selected from the group consisting of a plasticizer, an antioxidant, a thermal stabilizer, a UV stabilizer, a flame retardant, a lubricant, an antistatic agent, a foaming agent, an impact reinforcing agent, a filler, a crosslinking agent, a coloring agent, an antifogging agent, a nucleating agent, an antiblocking agent, and a slip agent.

5. An antimicrobial filament for 3-D printing prepared by claim 1.

* * * * *